Oct. 5, 1965
G. F. REDMAN
3,210,048
POLE SETTING JACK
Filed Aug. 7, 1963
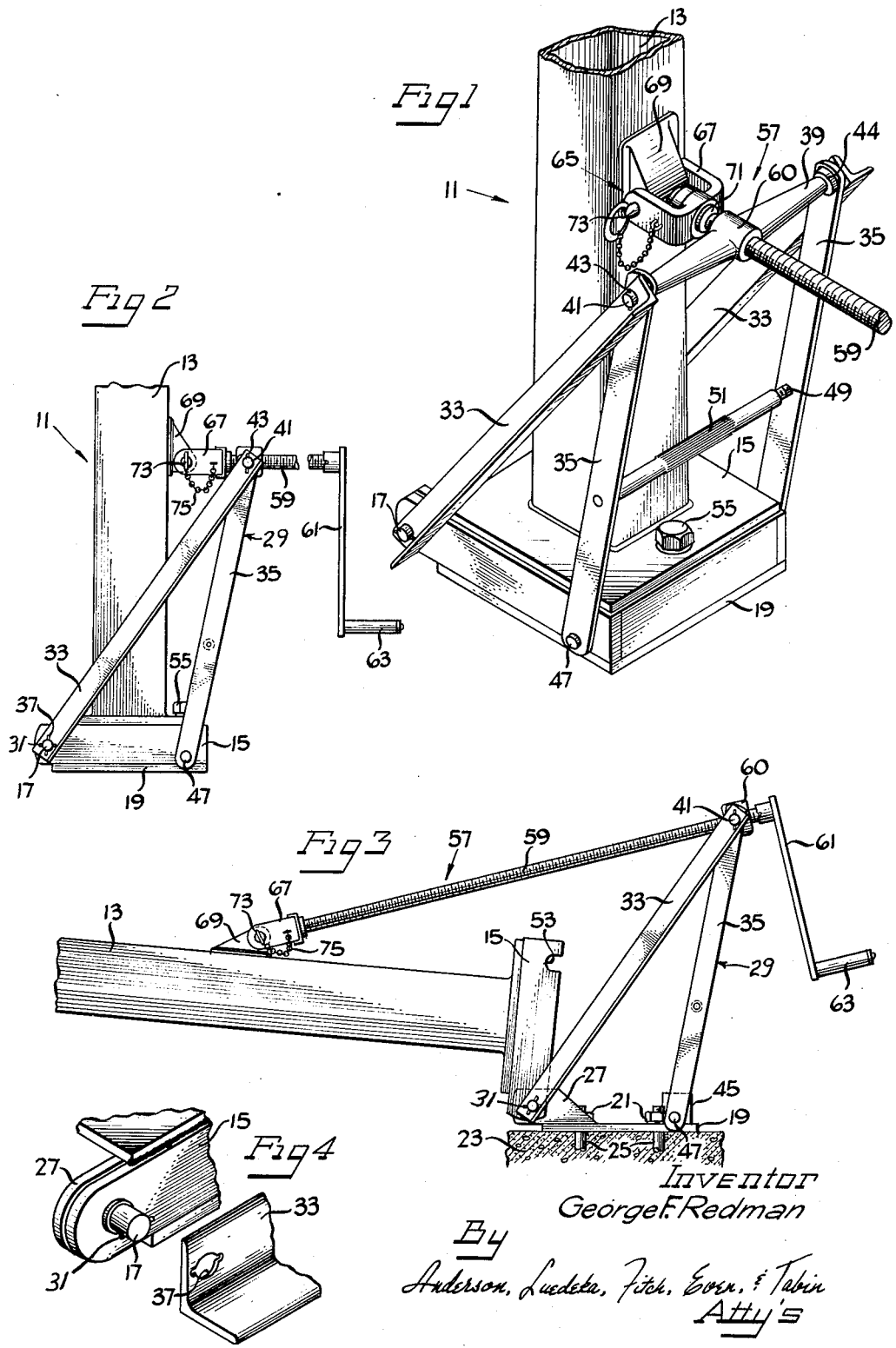
Inventor
George F. Redman
By
Anderson, Luedeka, Fitch, Even, & Tabin
Atty's

United States Patent Office 3,210,048
Patented Oct. 5, 1965

3,210,048
POLE SETTING JACK
George F. Redman, Chicago, Ill., assignor to Revere Electric Manufacturing Company, a corporation of Delaware
Filed Aug. 7, 1963, Ser. No. 300,597
5 Claims. (Cl. 254—101)

This invention relates to apparatus for erecting poles and the like and more particularly to portable apparatus for erecting individual poles of a type that require servicing.

Poles which support outdoor lighting, for example, must periodically be serviced for replacement of burned-out lamps, painting, and various other repairs. It has been found that servicing can be more economically performed if the poles are lowered so that the servicing operations may take place close to ground level. This method has proved superior over servicing by providing apparatus for raising a workman to a sufficient height to carry out the necessary maintenance.

Various devices have been developed for pivoting or hinging poles so that they can be lowered when maintenance is necessary. None of these devices has proved entirely satisfactory. Oftentimes, because of the particular design, more than one man is required to lower the pole, when only one man is needed to perform the servicing itself. Other devices have proved to have inherent safety hazards. Still other devices have been generally unreliable in their operation. Also, many of the poles incorporating such a servicing device did not have sufficient stability to weather high winds without damage.

The principal object of the invention is to provide improved apparatus for raising and lowering upright poles or the like. Another object of the invention is to provide portable means adaptable for easy and quick installation to an upright pole structure which apparatus can be used to lower the pole to a height suitable for servicing and then raise it to its upright position after servicing has been completed. A further object is to provide reliable apparatus, simple and inexpensive in design, which is suitable for the installation and servicing of upright poles. A still further object of the invention is to provide a stable pole structure and apparatus which is designed to permit the easy servicing of such a pole. These and other objects of the invention are more particularly set forth in the following detailed description and the accompanying drawings wherein:

FIGURE 1 is a perspective view of the lower portion of a pole and connected servicing apparatus made in accordance with the invention;

FIGURE 2 is a front elevational view, reduced in size, of FIGURE 1;

FIGURE 3 is a view similar to FIGURE 2 with the pole shown in the lowered position;

FIGURE 4 is a fragmentary exploded view of one of the connections between the pole and the servicing apparatus.

Basically, the invention provides apparatus for raising and lowering a light pole or the like that includes an elongated standard or pole portion surmounting a lower base portion which is hinged to a fixed mounting secured to the ground. The apparatus comprises a support structure which is detachably connectable to the fixed mounting of the pole so that a single, portable apparatus can be used to erect and service any number of poles. The support structure carries a jack means which includes an elongated rigid member that is longitudinally movable by a cooperating handle. Connecting means is positioned at the working end of the elongated rigid member to detachably interconnect the jack means and the pole, at a point spaced above the base of the pole. The jack means provides sufficient mechanical advantage so that the operator can easily raise and lower the pole without the help of another workman.

Because a single workman can quite easily lower, service and return to the upright position any pole requiring maintenance, the invention reduces the time needed to service a single pole and the work force necessary to carry out servicing, providing significant savings in routine maintenance expenses.

Now referring particularly to the drawings, FIGURES 1–3 show the lower portion of a tubular pole 11 suitable for the support of overhead lighting fixtures or the like. Although the pole 11 will be descibed in connection with outdoor lighting, the invention is not to be restricted to any particular type pole but is equally applicable for any long upright structure which is designed to support a device above ground level.

The pole 11 comprises a standard or pole portion 13 which is rigidly connected to a base portion 15. The base 15 is hinged at a point close to its forward end, by suitable hinge pins 17, to a mounting plate 19. The mounting plate 19 is rigidly secured to the ground by suitable means. As seen in FIGURE 3, the plate 19 is held by suitable nuts 21 to a poured concrete foundation 23 including four upstanding bolts 25 which fit through suitable holes provided in the plate 19.

The mounting plate 19 has a pair of upstanding, forwardly extending ears 27 rigidly attached, as by welding, to its upper face. The ears 27 hold the hinge pins 17 which are permanently seated therein. In the erection of the pole 11, holes in the base portion 15 are aligned with the mounting plate ears 27, and the hinge pins 17 are inserted from inside the ears 27 so that they extend outwardly through the ears and through the base section 15. Thus, the base 15 is permanently hinged to the mounting plate 19.

The pins 17 are of sufficient length so that they extend outward of the base 15 a sufficient distance to provide a support point for a jack support structure or mount 29 over the ends of the pins. As best seen in FIGURE 4, a stud 31, set in each hinge pin 17 at a point near its tip, retains the jack support structure on the pin 17.

The positioning of the hinge pins 17 relative to the center of gravity of the pole 11 is important. The relative positioning affects both the stability of the pole and its balance characteristics when it is being raised and lowered. By positioning the pivot point of the pole 11 at the forwardmost end of the base 15, a substantial distance forward of the center of gravity of the upright pole 11, an extremely stable pole structure is provided. It can be easily seen that in order to topple the upright pole 11, it is necessary to provide sufficient force to pivot the pole forward until its center of gravity is over the hinge point 17. Because of the distance between the hinge point and the center of gravity of the upright pole 11, the amount of this force is considerable. Accordingly, the pole 11 is extremely stable in its upright position.

The jack support structure 29 comprises front and rear legs 33, 35 disposed at each side of the pole base 15 and linked together near their upper ends. The front legs 33 have keyways 37 formed in their lower end portions that allow them to be fit over the retaining studs 31 disposed in the hinge pins 17. Because, during the erection of the pole 11, the front legs 33 will be in compression during the time the load exerted on them is the highest, they are preferably made of angle iron. The rear legs 35, which will be in tension at the aforementioned time, may be made from bar stock, as illustrated.

The upper ends of the four legs 33, 35, well above the mounting plate 19, are interconnected by a cross arm 39 which is greater in length than the width of the pole base 15. The cross arm 39 has cylindrical end portions 41 upon which the apertured upper ends of the front and rear legs 33, 35 are seated. Cotter pins 43 or the like retain the legs 33, 35 on the ends 41 of the cross arm. There is sufficient distance between flanges 44 on the cross arm 39, which limit the inward movement of the legs, and the cotter pins 43 to allow some lateral sliding movement of the legs 33, 35 on the end portions 41. Also, the apertures in the upper ends of the front legs 33 are slightly oversize. The looseness of the fit between the front legs 33 and the cross arm 39 plus the excess distance provides sufficient play in the connection whereby the lower ends of the front legs 33 can be fit over the stud-containing hinge pins 17.

As best shown in FIGURE 3, an upstanding bracket 45, rigidly attached to the mounting plate 19 near the rearward edge thereof, contains a pair of laterally extending cylindrical lugs 47 that serve as support points for the rear legs 35. The lower ends of the rear legs 35 are suitably apertured to fit over these lugs. To hold the rear legs 35 in position on the lugs, each leg is provided with an inwardly extending, oppositely threaded stud 49 at a point intermediate its ends. A turnbuckle-like rod 51, having a suitably tapped hole at each end, threadedly interconnects the studs 49. Turning of the turnbuckle rod 51 moves the rear legs closer together and holds them in this position on the lugs 47.

Notches 53 in the base 15, best seen in FIGURE 3, provide clearance between the base 15 and the cylindrical lugs 47 when the pole is swung to the upright position. A tapped hole in the upper portion of the upstanding bracket 45, aligned with a suitable aperture in the base 15, receives a cap screw 55 which, when tightened, secures the pole 11 in upright position.

The cross arm 39 pivotally supports jack means 57 that provides the mechanical advantage to facilitate the raising and the lowering of the pole 11. The illustrated jack means 57 comprises an elongated jack screw 59 which is threadably seated in a central, internally threaded boss 60 formed in the cross arm 39. A crank arm 61 having a handle 63 connected to the rearward end of the screw 59 allows the screw to be manually turned by the operator. Although the jack means 57 preferably includes the elongated jack screw 59 illustrated, other types of jack means may also be used. For example, an elongated rack member could be moved longitudinally by a suitable gear train arrangement designed to provide sufficient mechanical advantage to allow its manipulation by a single operator. Alternately, jack means similar to an automobile bumper jack or having an elongated hydraulic cylinder arrangement may be used.

Connecting means 65 at the front end of the jack screw 59 allows the screw to be detachably connected to the standard 13 of the pole. Preferably, cooperating means are also provided on the pole 11 at a position approximately the vertical level of the cross arm 39. The connecting means 65 may include any suitable device that allows reasonably quick attachment between the jack 57 and the pole 11. For instance, a flexible steel clamping band could be employed. Preferably, however, the connecting means 65 includes an apertured clevis 67 mounted at the forward tip of the jack screw 59 that can be aligned with a lug 69 rigidly affixed to the rear face of the standard 11. A removable locking pin 73, attached to the clevis 67 by a chain 75 is inserted through the aligned holes to interconnect the jack 57 and the pole 11. The clevis 67 includes a housing portion in which there is disposed a thrust bearing 71 which is positioned at the tip of the jack screw 59. The forward ends of the clevis 67 are rounded so that they do not interfere with the relative pivotal movement that occurs between the clevis 67 and the standard 13 during the raising and lowering of the pole 11.

In the erection of the pole 11, the pole base 15 is first aligned with the mounting plate 19 and the permanent hinge pins 17 installed. The front legs 33 are next connected to the hinge pins 17 by fitting the keyholes 37 over studs 31. Pivoting of the legs 33 locks them on the hinge pins 17. The rear legs 35 are next seated on the rear lugs 47, and the turnbuckle rod 51 rotated to draw the rear legs 35 together and lock them on the lugs 47.

At this point, the jack 57 is ready for operation. The crank handle 63 is then turned to run the jack screw 59 all the way forward, as seen in FIGURE 3.

In this position, the clevis 67 meets the lug 69 on the pole when the pole 11 has been elevated to a position about 5 degrees above the horizontal. Preferably, the length of the screw 59 is proportioned so that the pole does not reach the ground during servicing. This optional feature safeguards against possible damage to a light fixture or such disposed atop the pole 11. When the long pole 11 is resting on the ground, it can be manually raised to this position either by a workman at the upper end, or by mechanical means, such as a hoist on a truck. When the clevis 67 and lug 69 are aligned, the locking pin 73 is inserted and the pole jack 57 is ready for operation.

By turning the crank handle 63, the workman slowly raises the pole 11 to its upright position. As the center of gravity of the pole reaches a point over the forward hinge point, the rigid jack screw 59 continues to afford the operator positive control over the movement of the pole. Although the load is now working with the operator so that the crank handle 63 turns very easily, the rigidity of the screw 59 prevents the pole 11 from slamming into the mounting plate 19. Instead, it permits it to be gradually lowered until it is seated. The lock screw 55 is then inserted through the pole base 15 and threaded into the bracket 45 until tight.

The jack mounting 29 is easily removed by turning the turnbuckle bar 51 in the opposite direction to force the rear legs 35 outwardly so that their lower ends slip off the lugs 47. By removing the pin 73 to disconnect the clevis 67 from the lug 69 and disconnecting the front legs 33, the detachment is complete, and the jack may be used to erect or service another pole 11.

The combination of the rigid jack member 59 and the positioning of the hinge point 17 likewise provides stability and positive control during the lowering of the pole 11. When servicing is desired, the jack mounting 29 is attached to the mounting plate 19, the connection made between the clevis 67 and lug 69, and the cap screw 55 is removed. Turning of the crank handle 63 serves to kick or pivot the pole 11 from its upright position. There is no need to manually apply force to the body of the pole itself to start the downward descent of the pole 11. Thus, the movement of the pole 11 is always under positive control of the operator of the jack throughout the entire descent.

This stable arrangement provides safety features which greatly reduce the possibility of a mishap that could cause injury to the operator or to the pole. Furthermore, only a single serviceman is required to adequately service such a pole.

Various of the features of the invention are set forth in the following claims.

What is claimed is:

1. Apparatus for raising and lowering a light pole or the like that includes an elongated standard surmounting a base which is pivotally connected to a fixed mounting secured to the ground, which apparatus comprises an upright support structure adapted to be connected to said mounting to stand alongside said pole, means for detachably connecting said support structure to the mounting, jack means pivotally connected to said support structure at a height well above said mounting, said jack means including an elongated rigid member having connecting means at one end and also including means for moving said rigid member longitudinally, said connecting means being adapted to detachably connect said rigid member to the pole at a position spaced above the base thereof, whereby a light pole can be easily raised and lowered by a single workman.

2. Apparatus for raising and lowering a light pole or the like that includes an elongated standard surmounting a base which is pivotally connected to a fixed mounting secured to the ground, which apparatus comprises a support structure including pairs of front and rear legs pivotally interconnected by a cross arm, said pivotal connections allowing lateral movement of said legs relative to said cross arm, means for detachably connecting said legs near the bottom ends thereof to the fixed mounting, means interconnecting at least one pair of legs at points intermediate the ends thereof for moving said pair of legs closer together so as to lock said legs in connection with the mounting, jack means connected to said cross arm, said jack means including an elongated rigid member having connecting means at one end and also including means for moving said rigid member longitudinally relative to the jack, said connecting means being adapted to detachably connect said rigid member to the pole at a position spaced above the base thereof, whereby a light pole can be easily raised and lowered by a single workman.

3. Apparatus for raising and lowering a light pole or the like that includes an elongated standard surmounting a base which is pivotally connected to a fixed mounting secured to the ground, which apparatus comprises an upright support structure adapted to be connected to said mounting to stand alongside said pole, means for detachably connecting said support structure to the mounting, an elongated jack screw threadably connected to said support structure at a height well above said mounting, said screw being pivotal relative to said support structure, crank means for moving said screw longitudinally in its threaded connection, and connecting means secured to the end of said screw detachably connecting said screw to the pole at a position spaced above the base thereof, whereby a light pole can be easily raised and lowered by a single workman.

4. Apparatus for raising and lowering a light pole or the like that includes an elongated standard surmounting a base which is pivotally connected to a fixed mounting secured to the ground, which apparatus comprises a support structure including pairs of front and rear legs pivotally interconnected by a cross arm, said pivotal connections allowing lateral movement of said legs relative to said cross arm, means for detachably connecting said legs near the bottom ends thereof to the fixed mounting, means interconnecting at least one pair of legs at points intermediate the ends thereof for moving said pair of legs closer together so as to lock said legs in connection with the mounting, an elongated jack screw threaded through said cross arm, a crank at one end of said jack screw, and connecting means at the other end of said jack screw, said connecting means being adapted to detachably connect said rigid member to the pole at a position spaced above the base thereof, whereby a light pole can be easily raised and lowered for maintenance purposes by a single workman.

5. Apparatus for raising and lowering a light pole or the like that includes an elongated standard surmounting a base which is pivotally connected to a fixed mounting secured to the ground, which apparatus comprises an upright support structure adapted to be connected to said mounting to stand alongside said pole, means for detachably connecting said support structure to the mounting, an elongated jack screw of predetermined length threadably connected to said support structure at a height well above said mounting, said screw being pivotable relative to said support structure, crank means for moving said screw longitudinally in its threaded connection, and connecting means secured to the end of said screw for detachably connecting said screw to the pole at a position spaced above the base thereof, whereby a light pole can be easily raised or lowered for maintenance purposes by a single workman, and whereby the predetermined length of the screw permits the pole to be lowered only so far as a position about five degrees above the horizontal.

References Cited by the Examiner
UNITED STATES PATENTS

| | | | |
|---|---|---|---|
| 900,726 | 10/28 | Gwynne | 254—67 |
| 1,049,094 | 12/12 | Hourland | 214—3 |
| 2,268,796 | 1/42 | Brauer | 189—15 |

WILLIAM FELDMAN, *Primary Examiner.*

MILTON S. MEHR, *Examiner.*